Figure 1:
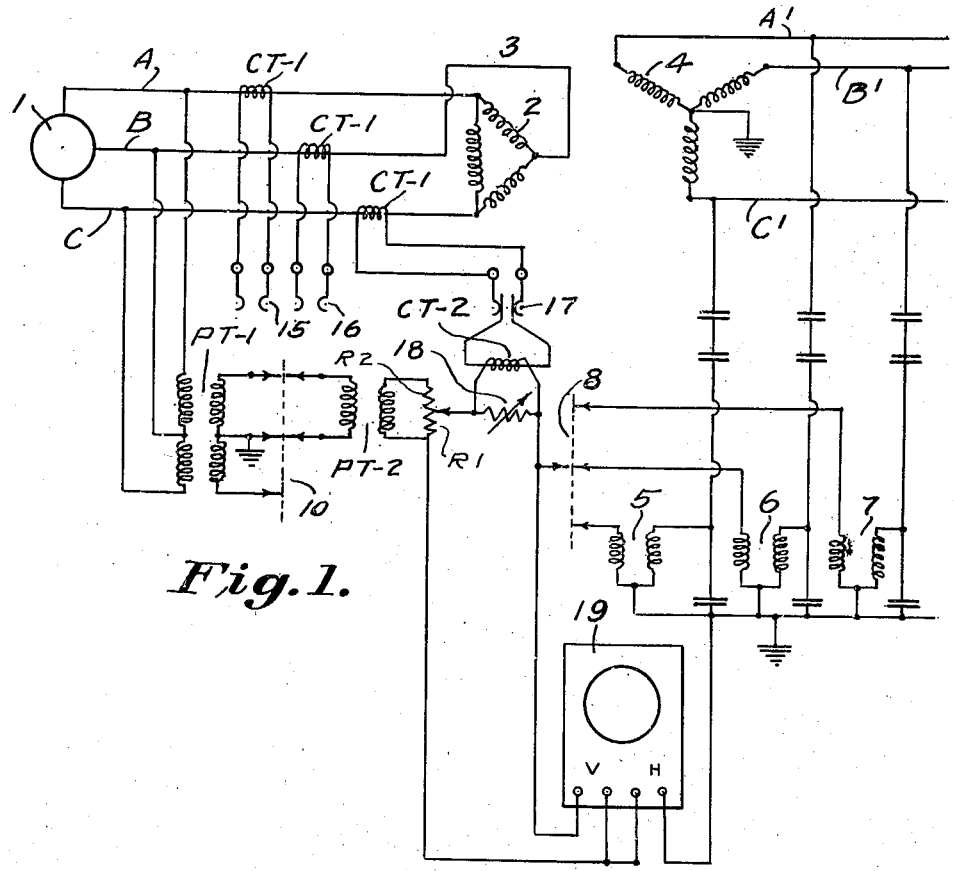

Sept. 6, 1949.  F. R. SCHLEIF  2,480,881
APPARATUS FOR ADJUSTING CAPACITOR POTENTIAL DEVICES
Filed Feb. 6, 1946  2 Sheets-Sheet 1

INVENTOR
FERBER R. SCHLEIF
BY
ATTORNEY

Sept. 6, 1949.  F. R. SCHLEIF  2,480,881
APPARATUS FOR ADJUSTING CAPACITOR POTENTIAL DEVICES
Filed Feb. 6, 1946  2 Sheets-Sheet 2
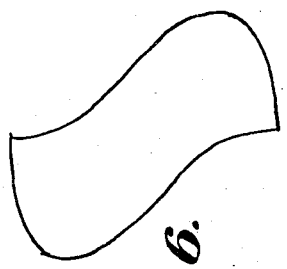
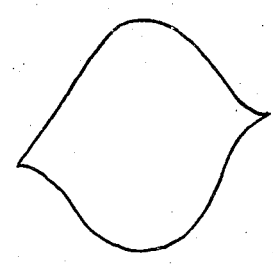
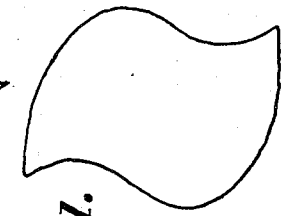
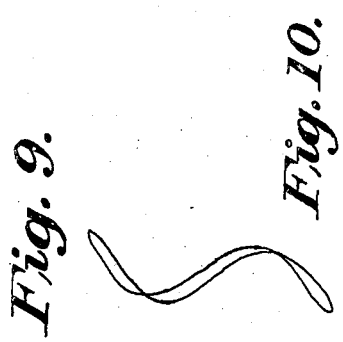
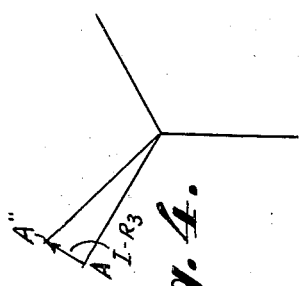
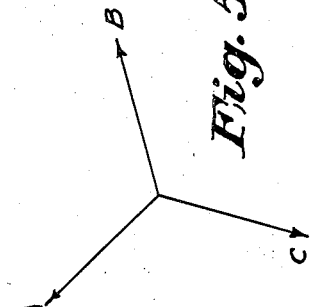
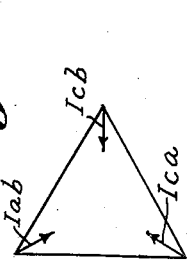
INVENTOR
FERBER R. SCHLEIF
BY
*J. F. Motherhead*
ATTORNEY Patented Sept. 6, 1949

2,480,881

UNITED STATES PATENT OFFICE 2,480,881

APPARATUS FOR ADJUSTING CAPACITOR POTENTIAL DEVICES

Ferber R. Schleif, Coulee Dam, Wash.

Application February 6, 1946, Serial No. 645,975

1 Claim. (Cl. 175—183)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to an apparatus for adjusting capacitor potential devices, and particularly to an apparatus for adjusting said devices under full load and without interrupting delivery of power.

Capacitor potential devices provide an inexpensive means of obtaining metering and synchronizing voltages and simultaneously the coupling of carrier frequencies to high-voltage power transmission lines. The metering voltages available from capacitor potential devices are adjustable over a wide range of ratio and phase angles and careful adjustment of the capacitor device is necessary.

For known burdens on the capacitor devices very approximate adjustments can be made from factory calibration data, but if any reliance is to be placed on the metering, laborious checks and adjustments must be made which usually necessitate unloading the main power transformer bank in order to eliminate the effect of the transformer reactance drop. Tests are usually made by means of a volt meter and watt meter or phase angle meter, but the capacitor device voltage changes with removal of the test instruments and some error is consequently always present.

This invention has for an object the provision of a fast, convenient and highly accurate means of adjusting capacitor potential devices without interrupting the delivery of power.

A further object of the invention is to provide an automatic check on the wave form of the capacitor device voltages.

A still further object is to facilitate correction or elimination of the sources of distortion or harmonics. Other objects and advantages of my invention will be apparent from the description hereinafter given.

This invention can be used wherever capacitor potential devices are used near transformers or where a low voltage is obtainable through transformers. The convenient and accurate adjustment of capacitor potential devices which this invention affords may permit capacitor devices to be used in many applications where, at the present time, more expensive potential transformers are being employed. This invention is intended for use in connection with the standard potential and current transformers ordinarily comprising a part of the permanent installation in power plants. These transformers are designed to deliver voltages of a fixed value which may or may not be equal to the voltages to be derived from the capacitor devices.

The invention comprises three principal phases—(1) the setting up of a reference voltage of the correct magnitude and phase angle from low-side metering voltage by means of a transformer reactance or impedance drop compensator; (2) balancing this artificially produced reference voltage against the output voltage of the capacitor potential device to be adjusted so that only the difference voltage is measured; and (3) applying the difference voltage and the reference voltage to a suitable indicating means. It has been found practical to apply the voltages to separate sweeps of a conventional cathode-ray oscilloscope so that ratio error and phase angle error are readily distinguishable and correct adjustment is more quickly reached.

In describing my invention, reference will be made to the accompanying drawings which illustrate the preferred form of the invention found satisfactory in actual practice.

In the drawings, Figure 1 is a schematic wiring diagram of a capacitor potential device adjusting instrument.

Figure 2:
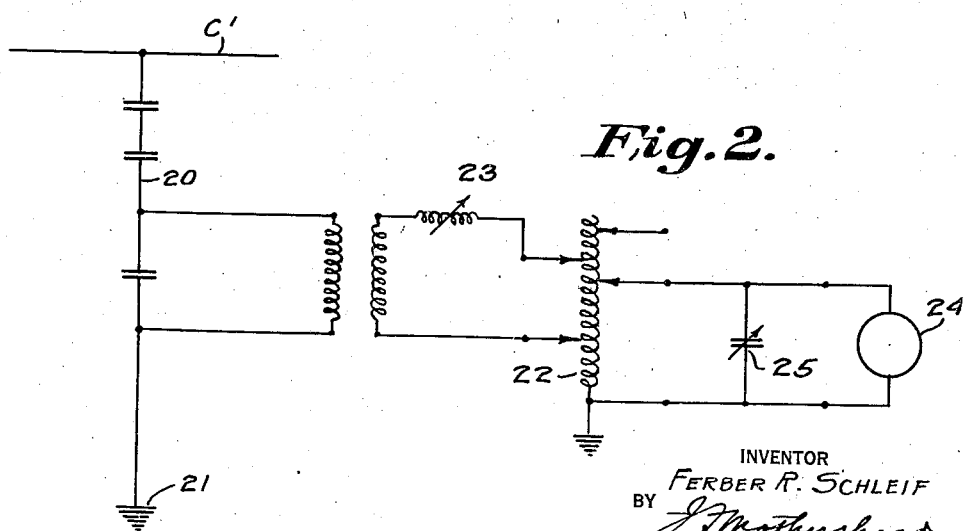

Figure 2 is a schematic wiring diagram of a typical capacitor potential device.

Figures 3 to 5, inclusive, are vector diagrams of the voltages and currents in the windings of the delta-Y transformer.

Figures 6 to 12, inclusive, are tracings of oscilloscope figures showing the patterns obtained during adjustment of a set of capacitor potential devices by the apparatus herein described.

Referring to Figure 1 of the drawings, in which similar reference characters designate corresponding parts, I represents a generator feeding through conductors A, B and C to the primary 2 of delta-Y transformer 3. The output of the secondary 4 of the transformer is delivered to power lines $A^1$, $B^1$ and $C^1$. Connected to the power lines $A^1$, $B^1$ and $C^1$ are capacitor potential devices 5, 6 and 7. One of the output terminals of each of the capacitor potential devices is connected to corresponding terminals of a tandem switch 8. The capacitor potential devices are illustrated in Figure 1 more or less diagrammatically and may be in any of the conventional forms that such devices are now available. A typical capacitor potential device is shown schematically in Figure 2.

Referring for the moment to Figure 2, $C^1$ represents a power line feeding through a condenser bushing 20 to a ground connection 21. The voltage ratio or magnitude of the output voltages of the capacitor potential devices is adjusted by vernier taps on the output transformer 22. Phase angle adjustment is made by adjusting the series reactance 23 in the circuit to the output transformer 22. Compensation for lagging power factor of the burden 24 is adjusted by capacitors 25 across the output of the capacitor potential device.

A reference voltage equal, in magnitude and phase position, to the voltage from the capacitor potential device to be adjusted is obtained from the low side of the delta-Y transformer. This artificially produced voltage is balanced against the output voltage from the potential device so that the difference voltage alone is measured.

Connected to and deriving power from the low side of the line is a potential transformer bank PT—1. The low side of this transformer is connected through tandem switch 10 to the high side of a second potential transformer PT—2. The ratio of this transformer may conveniently be 1 to 1. The output of transformer PT—2 is fed through potentiometer $R_1$—$R_2$ from which is taken the correct voltage to balance the voltage of the capacitor potential device. The setting of the potentiometer is correct when it delivers a proportion of the rated voltage of the low voltage side of the power transformer divided by the overall potential transformer ratio (PT—1 ratio x PT—2 ratio) which is equal to the rated high side volts of the power transformer divided by the desired capacitor potential device ratio. This relation may be expressed as follows:

$$\frac{R_1}{R_1+R_2} = \frac{\text{Rated trans. hi-side volts to neut.} \times \text{PT—1 ratio} \times \text{PT—2 ratio}}{\text{Req'd. pot. device ratio} \times \text{trans. rated low side volts}}$$

This formula is used for setting the potentiometer of the instrument for the desired ratio of the capacitor potential device and the power transformer bank through which it is adjusted. Potential transformer PT—2 is employed for the purpose of avoiding the complication of a protective ground on the potential supply.

In order that the capacitor potential devices may be adjusted without interrupting the delivery of power through the power transformer bank around which the adjustments are made there is provided a transformer reactance compensation. When a load is applied to the power lines $A^1$, $B^1$, $C^1$ the phase of the voltage derived by the capacitor potential devices is shifted from that shown vectorially in Fig. 4 to that shown in Fig. 5, for example. In order that the reference voltage to be derived from potentiometer $R_1$ may be correspondingly shifted in phase there is added to it vectorially by means of resistor 18 a voltage derived from transformer CT—2. Transformer CT—2 derives its primary voltage from an appropriately selected current transformer of the group designated CT—1. These may be the metering current transformers usually available on the circuit to either the low or high side of the power transformer bank. The appropriate transformer for the particular capacitor potential device being adjusted is connected through jacks 15, 16 and 17 to a second current transformer CT—2. As in the case of potential transformer PT—2, current transformer CT—2 is employed to eliminate the complication of the protective ground on the transformer circuits of current transformers CT—1.

The value $R_3$ of resistor 18 which will vary with the constants for each device being adjusted may be computed from the following formula:

$$R_3 = \frac{\text{Trans. \% imp.} \times \text{rated trans. hi-side volts to neut.} \times CT1 \text{ ratio} \times CT2 \text{ ratio}}{\text{Req'd. pot. device ratio} \times \text{rated trans. line current}}$$

Rated transformer line current in this formula may be that of either the low side or the high side of the power transformer bank, whichever flows through the metering current transformers CT—1 being used.

In order to compensate for reactance drop by this circuit, the current from the phase opposite to the phase from which the voltage is obtained must be used. This is shown in vector diagrams, Figures 3 to 5, inclusive. Fig. 3 shows vectorially the voltages and currents in the respective windings of the low side 2 of the delta-Y transformer 3, while Fig. 4 shows the voltages in the windings of the high side 4 of the transformer. Fig. 5 shows the voltages in the windings 4 shifted in phase due to a load on the power line. The vector A—A'' represents the value of the current to be added through resistor 18.

The reference voltage and the difference voltage between the reference voltage and the voltage from the capacitor potential device being adjusted are applied to separate sweeps of a conventional cathode-ray oscilloscope 19, so that ratio error and phase angle error are readily distinguishable and correct adjustment more easily reached.

On the oscilloscope, ratio error produces a diagonal trace; phase angle error produces an elliptical trace; ratio and phase angle error combined produce a diagonal ellipse or loop. Correct adjustment is reached when a vertical straight line is obtained. Harmonics produced in the capacitor device or in its connected burden appear as distortions of the trace since any instantaneous difference between the reference voltage and the voltage under adjustment is shown by the oscilloscope. Since in a cathode-ray oscilloscope, both the magnitude and the phase angle of the voltage by which the capacitor potential device output differs from the reference voltage are visible, adjustments may be made directly rather than by trial and error. Typical oscilloscope traces are shown in Figures 6 to 12, inclusive. In Figs. 6, 8 and 11 are shown traces on the oscilloscope before adjustment of the capacitor device. The traces represent errors both in ratio and phase angle. Figs. 7, 10 and 12 illustrate traces obtained when the ratio and phase angle have been properly adjusted. The small loops in the figures are due to harmonics. Fig. 9 represents the trace obtained under the best adjustment conditions obtainable by methods employed prior to the present invention.

The balancing of the artificially produced reference voltage against the output voltage of the capacitor potential device being adjusted is a null balance process and consequently no additional burden is placed on the capacitor device. The capacitor potential devices can thus be adjusted under their full burden and the adjustment remains correct after the adjusting circuit is disconnected.

It will be obvious that changes may be made in the application of the underlying principles of my invention and that my invention is not limited to the circuit shown, but that other means of obtaining a compensated reference voltage and balancing the same against the output of the device to be adjusted may be employed.

Having described the invention, what is claimed is:

A circuit for use in adjusting a capacitor potential device deriving a voltage from the high side of a power line transformer bank in a conventional polyphase power line while said power line is under load, comprising a means including a potential transformer connected to the low side of said power line transformer bank for deriving a potential therefrom equal in magnitude to the voltage to be derived from said capacitor potential device to be adjusted, a compensating means, including a current transformer connected to said low side of said power line transformer bank, connected in series with said potential deriving means for adjusting the phase of said potential to compensate for variations in phase due to variations in load on the high side of said transformer bank, a cathode ray oscilloscope having a pair of horizontal and a pair of vertical deflection plates, circuit means for connecting said phase adjusted potential across one pair of said deflection plates and circuit means for connecting said phase adjusted potential and the voltage from said capacitor potential device in opposition to each other and across the other pair of deflection plates of said oscilloscope.

FERBER R. SCHLEIF.

REFERENCES CITED

The following references are of record in the file of this patent:

UNITED STATES PATENTS

| Number | Name | Date |
|---|---|---|
| 1,588,539 | Fortescue | June 15, 1926 |
| 1,815,217 | Shotter | July 21, 1931 |
| 1,870,851 | Jones | Aug. 9, 1932 |
| 1,914,396 | Austin | June 20, 1933 |
| 1,967,652 | Austin et al. | July 24, 1934 |
| 2,012,480 | Reich | Aug. 27, 1935 |
| 2,162,009 | Goldsmith, Jr. | June 13, 1939 |
| 2,357,138 | Seeley | Aug. 29, 1944 |
| 2,369,799 | Robinson | Feb. 20, 1945 |

OTHER REFERENCES

Powell, The Electrical Review, Oct. 6, 1933, page 448.

Journal of Scientific Instruments, March 1945, pages 55–56.